United States Patent
Kraenzler et al.

(10) Patent No.: US 6,910,729 B2
(45) Date of Patent: Jun. 28, 2005

(54) THERMALLY COMFORTABLE GLASS

(75) Inventors: Thomas Kraenzler, Salem (DE); Andreas Leupolz, Horgenzell (DE); Werner Scherber, Bermatingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/690,706

(22) Filed: Oct. 21, 2003

(65) Prior Publication Data

US 2004/0124665 A1 Jul. 1, 2004

(30) Foreign Application Priority Data

Oct. 23, 2002 (DE) .......................................... 102 49 263

(51) Int. Cl.⁷ ................................................. B60J 1/00
(52) U.S. Cl. ................................................. 296/146.15
(58) Field of Search ...................... 296/146.15; 428/432, 428/697, 702, 913

(56) References Cited

U.S. PATENT DOCUMENTS

| | | | | |
|---|---|---|---|---|
| 4,091,793 A | * | 5/1978 | Hermann et al. | 126/648 |
| 4,144,875 A | * | 3/1979 | Bruno et al. | 126/662 |
| 4,423,104 A | * | 12/1983 | Pusch et al. | 428/101 |
| 4,968,563 A | | 11/1990 | Thomas et al. | 428/432 |
| 4,986,343 A | * | 1/1991 | Sing | 165/41 |
| 5,124,833 A | | 6/1992 | Barton et al. | 359/269 |
| 5,154,953 A | | 10/1992 | De Moncuit et al. | 428/34 |
| 5,202,788 A | | 4/1993 | Weppner | 359/270 |
| 5,466,037 A | * | 11/1995 | De Lena | 296/211 |
| 6,407,847 B1 | * | 6/2002 | Poll et al. | 359/275 |
| 6,496,295 B1 | | 12/2002 | Wittwer et al. | 359/273 |
| 2002/0017592 A1 | | 2/2002 | Leupolz et al. | 244/118.5 |
| 2004/0028953 A1 | | 2/2004 | Kraemling | 428/698 |

FOREIGN PATENT DOCUMENTS

| | | |
|---|---|---|
| DE | 39 40 660 | 6/1990 |
| DE | 196 31 420 | 2/1998 |
| DE | 37 34 982 | 5/2000 |
| DE | 199 27 683 | 1/2001 |
| DE | 10027925 | 12/2001 |
| DE | 100 43 141 | 3/2002 |
| EP | 0470597 | 2/1992 |
| EP | 0551138 | 1/1993 |
| EP | 0408427 | 9/1994 |
| EP | 1 003 067 | 5/2000 |

* cited by examiner

*Primary Examiner*—H. Gutman
(74) *Attorney, Agent, or Firm*—Davidson, Davidson & Kappel, LLC

(57) ABSTRACT

A vehicle window includes a pane of self-darkening or laminated glass and a function layer made of a low-emission material disposed on an inside surface of the pane. The function layer reflects a first infrared radiation into the vehicle and reduces an emission of a second infrared radiation from the glass pane into an interior of the vehicle. In addition, a method for regulating a thermal comfort of a passenger in an interior of a vehicle includes the steps of providing a self-darkening glazing as protection against glare and heat, disposing an IR-reflecting transparent layer on the glazing in form of a coating or film, reflecting an infrared radiation emitted from the vehicle interior back into the vehicle interior using the IR-reflecting transparent layer, and reducing a heat radiated by the glazing into the vehicle interior.

7 Claims, 1 Drawing Sheet

Summer situation (S)    Winter situation (W)

THERMALLY COMFORTABLE GLASS

Priority is claimed to German Patent Application No. DE 102 49 263.8-45, filed Oct. 23, 2002.

BACKGROUND

The present invention relates to a method for regulating the heat radiated by the glazings of vehicle interiors, as well as self-shading, thermally comfortable glass in vehicles.

It is a known fact in climate control technology that the thermal comfort of people in enclosed spaces depends on an even thermal balance between the person and his surroundings. Substantial thermal comfort or a comfortable feeling of warmth is achieved when the heat produced by the person is equal to the heat emitted to his surroundings. Important external factors influencing thermal comfort are the properties of ambient air, in particular temperature, humidity and velocity, as well as radiation, in particular the heat radiated by the surrounding surfaces.

The interplay between the properties of ambient air and radiation from the surrounding surfaces can, to a certain extent, result in an even thermal balance. Thus, low air temperatures can be partially equalized through increased thermal radiation or radiation temperature. Conversely, high radiation temperatures must be equalized by supplying cold air.

In enclosed vehicles, the interplay between air temperature, air flow, and radiant heat has a particular effect on the thermal comfort perceived by the passengers.

In the case of low outside temperatures, also referred to below as the winter situation, the temperatures of the surrounding surfaces are relatively low. This applies in particular to vehicle glazings that, unlike the double glazings common in building technology, are constructed of only a single glazing, or single pane, with poor thermal insulation properties. As a result, the inside of the glass has a low radiation temperature and correspondingly low thermal radiation. Passengers find the proximity of these "cold-radiating" surfaces to be uncomfortable. This is particularly true of roof glazings, where the head area is in close proximity to the cold surface.

In the "summer situation S," not only does a high outside temperature prevail, but also, in particular, a high level of incident sunlight. The heat radiated into the vehicle forms the lion's share of the heat added to the thermal balance inside the vehicle. To reduce incident sunlight, the glass is typically shaded on the inside. For reasons of comfort, self-shading glazing is also used nowadays. It functions completely without the need for mechanical shading devices such as blinds or sliding panels.

Self-shading glazings operate by reducing transparency by increasing light absorption, thereby darkening the vehicle interior. They are used as protection against glare and heat. Self-darkening glass or laminated glass is used for self-shading glazings, usually electrochrome glass or glass with SPD (suspended particle device) films. In both cases, the transmission of light is switched from bright transmission to dark transmission through an external electrical pulse. As used herein, "bright transmission" of a glazing refers to the percentage of incident light transmitted through the glazing in an undarkened state, and "dark transmission" of a glazing refers to the percentage of incident light transmitted through the glazing in a darkened state. The structure and function of SPD films according to the definition of the species are known, for example, from European Patent Document EP 0 551 138 B1. The structure and function of electrochrome glass or laminate glass according to the definition of the species are known, for example, from European Patent Document EP 0 408 427 A1 and European Patent Document EP0 470 597A2.

The radiation absorbed by the darkened glass is largely converted to heat. When the glazing is shaded in the presence of incident sunlight (the summer situation), this substantially raises the temperature. It is known that radiant power Q of a body is proportional to four times its surface temperature $T_o$. This is why shading the glazing in the presence of incident sunlight, also referred to below as the summer situation, substantially increases thermal radiation. Thermal radiation occurs mainly in the infrared (IR) range, thermal IR having a maximum wavelength ranging from 8 $\mu$m to 12 $\mu$m and thus accounting for the main component. Near-IR, having wavelengths from approximately 0.1 $\mu$m to 2 $\mu$m, contributes much less to thermal radiation. The radiation of the hot surface inside the vehicle helps increase the temperature to an undesirable extent and is felt to be extremely unpleasant.

A system that makes it possible to increase thermal comfort in passenger aircraft in the case of low outside temperatures or cold surrounding surfaces is known from German Unexamined Patent Application DE-OS 100 27 925. This is accomplished by applying to the inner wall of the cabin a low-emission or LE layer that is suitable for reflecting the infrared radiation, or the thermal radiation, back into the interior. The LE layer is preferably made of a doped and conductive tin oxide (SnO) material. This system does not take into account the summer situation.

SUMMARY OF THE INVENTION

An object of the present invention is therefore to describe a method for improving the thermal comfort of vehicle passengers, both in the winter situation and in the summer situation, as well as to provide a self-shading glazing for vehicle interiors that improves thermal comfort both in winter and in summer.

The present invention provides a method for regulating the thermal comfort of passengers in vehicles, wherein a self-darkening glazing (2) is used as protection against glare and heat, an IR-reflecting, transparent coating or film (1) being provided thereon so that it reflects the infrared radiation (4") emitted by the vehicle interior back into the vehicle interior and reduces the heat radiated by the glazing (4') into the vehicle interior.

In addition, the present invention provides a method for regulating the heat radiated by the glazings of vehicle interiors by applying an IR-reflecting transparent coating or film made of an LE material to a self-darkening glazing, including silicate and/or polymer glass, so that the infrared radiation emitted from inside the vehicle is reflected back into the vehicle interior and the infrared radiation emitted by the self-darkening glazing is output primarily only on the weathering side. Furthermore, a self-shading, thermally comfortable glazing is provided, whose self-darkening glass, including silicate and/or polymer glass, carries a coating or foil made of a low-emission (LE) material on the inside of the vehicle, this material being suitable for reflecting infrared radiation into the vehicle interior as well as for preventing the glazing from emitting IR into the vehicle interior.

For the use of self-shading glazings in vehicles, the bright transmission should preferably be higher than approximately 20 percent (i.e., more than approximately 20 percent of incident light is transmitted through the glazing in an undarkened state of the glazing) and the dark transmission preferably lower than approximately 5 percent (i.e., less than 5 percent of incident light is transmitted through the glazing in a darkened state of the glazing). Maximum differences between bright and dark transmission are desired for road vehicles, in particular passenger cars, trucks, and busses. The bright transmission is preferably higher than 30 percent and the dark transmission lower than 2 percent. In comparison, the transmission of a normal glass used in typical applications is around 80 percent.

These optical requirements are generally met by electrochrome glass and laminated glass as well as by glass to which SPD films have been applied. The term "glass" includes both silicate glass, such as window glass, and glass made of polymers, such as PLEXIGLAS (polymethylmethacrylate) or polycarbonate glass.

The structure according to the present invention may, of course, also include not only electrochrome glass and laminated glass having SPD film, but also any other self-darkening glass in which darkening results in heating of the glass.

BRIEF DESCRIPTION OF THE DRAWINGS

The function principle and structure are explained in greater detail with reference to the drawings, in which.

DETAILED DESCRIPTION

Figures 1A, 1B:
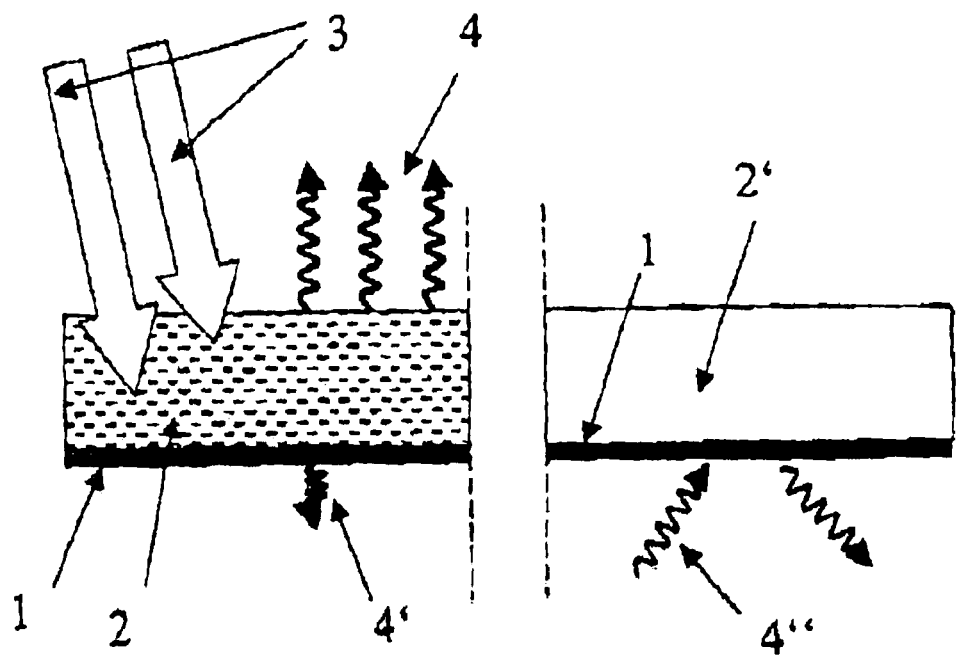
FIG. 1a shows a an embodiment of a glazing in the summer situation according to the present invention.
FIG. 1b shows the glazing in the winter situation according to the present invention.

As shown in FIG. 1a, in the summer situation S, the glazing includes darkened glass 2 and a function layer made of LE material 1 having incident sunlight 3, infrared radiation 4 emitted by the glass, as well as infrared radiation 4' emitted by function layer 1. In the winter situation W shown in FIG. 1b the glazing includes non-darkened glass 2' as well as infrared radiation 4" reflected at function layer 1. The schematic structure shown in FIG. 2 includes two panes 5, an SPD film 6, and the function layer made of LE material 1.

In the summer situation S, the self-darkening glass is darkened by an external electrical pulse, which reduces the transmission of the sunlight heating the interior to a low percentage. In closed vehicles, the heating of the glass due to absorption may raise temperatures to above roughly 80° C. Temperatures between 70 and 80° C. are easily reached, in particular in the area of the roof glazing. The radiation temperature and the radiated thermal energy are therefore also equally high. The high radiation temperatures place a disadvantageous burden on the passengers.

In the method according to the present invention for reducing the heat radiated into the vehicle interior, a low-emission function layer 1 that reflects the heat or infrared radiation to the outside is provided on the side of the glass facing the vehicle interior (see FIG. 1a). The function-layer emission factor for infrared radiation is preferably below 0.6 and particularly preferably below 0.5. According to the present invention, the function layer is formed by a transparent coating that reflects thermal radiation and is made of an LE material or a film containing an LE material.

Although the layer of LE material 1 has the same temperature as darkened glass 2, it emits only a fraction of infrared radiation 4' as glass 4 itself due to its lower emission factor. The radiation temperature, i.e., the temperature of an ideal black body having the same radiation intensity, is therefore much lower than that of the glass. The difference may be as much as 70° C., depending on the design. Vehicle passengers thus feel only a cool surface even when the glass roof is heated; they are not exposed to any additional heating via the heat radiated by the glazing surface. As another consequence, it is possible to substantially reduce the supply of fresh or cold air by air conditioners, which is felt to be unpleasant. In the summer situation, this substantially increases thermal comfort.

In the method according to the present invention, the heat radiated outward by the passengers or the interior is reflected back into the vehicle interior. Surprisingly, this may be accomplished by using the same layer of LE material on the inside of the vehicle that was used for increasing thermal comfort in the summer situation.

While the amount of heat reflected back into the vehicle interior by the function layer is proportionately low in the summer situation S, compared to the overall thermal balance, this heat is significant in the winter situation W. The non-darkened glass that is cooled by the low outside temperatures has only a low radiation temperature and makes the passengers feel unpleasantly cold. The passengers emit more thermal radiation than they receive from the corresponding surface of the glass. The thermal radiation emitted, in particular, by the passengers (FIG. 1b, 4") is reflected at the glazing surface by the LE layer or film so that the surface now feels warmer to the passenger. In the winter, this also increases the thermal comfort of the vehicle passengers.

Electrically conductive oxides are particularly suitable as the LE material for the method according to the present invention, since the electrical conductivity and reflection of thermal radiation are approximately proportionate to each other. The LE materials are preferably based on tin oxide (SnO). Indium/tin oxides (ITO) and fluorine-doped tin oxides (FTO) are particularly preferred. In principle, a very thin layer of silver (Ag) or other highly conductive metals is suitable as the LE material. Due to the oxidation sensitivity and low scratch-resistance of the layers produced hereby, the layers must be provided with additional sealing.

The glass may be coated by the usual thin-film methods, for example physical vapor deposition (PVD), chemical vapor deposition (CVD), sol-gel coating, or spray pyrolysis. PVD is preferably used for coating films. Spray pyrolysis is particularly suitable for the manufacture of car glazings made of laminated glass having SPD films. In this case, aqueous ITO precursor solutions are preferably sprayed onto the heated glass and fired. The layers thus produced have a maximum thickness of around 1 $\mu$m.

The thermally comfortable glazing according to the present invention is thus made of a self-darkening glass and an LE layer, the LE layer being provided on the inside of the vehicle. In the summer situation, the LE layer results in a low radiation temperature of the glass surface inside the vehicle. In winter, the LE layer causes the infrared radiation emitted by the vehicle passengers to be reflected back to the vehicle interior.

Figure 2:
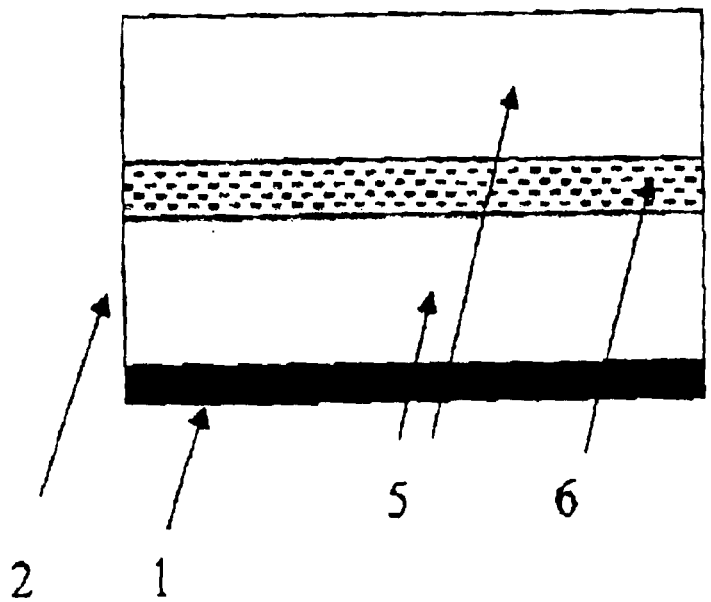
FIG. 2 shows the schematic structure of a preferred self-shading, thermally comfortable glazing.

According to a particularly advantageous embodiment of the present invention, which is illustrated schematically in FIG. 2, the glazing is constructed of at least four layers or laminates. Laminated safety glass is preferably used as the glass in automotive applications. On the weathering side, there is a first layer made of glass 5, followed by a shading SPD film 6 and then another layer made of glass 5. According to this configuration, SPD film 6 additionally performs the function of the separation film commonly used in laminated safety glass. LE layer 1 is provided on the inside of the vehicle.

Because LE materials are, in part, impermeable to visible light, they may in some circumstances have a negative influence on bright transmission. The coating or foil made of an LE material is therefore designed so that the absorption in the range of visible light is less than 10 percent and preferably less than 5 percent.

The absorption of a given LE layer is easily controlled by the layer thickness of the LE material. According to the present invention, the LE materials on the glass or in the film are applied in a layer thickness of less than 1 μm, preferably less than 500 nm and particularly preferably in the range of 50 nm to 200 nm.

Another aspect of the present invention concerns the use of self-darkening, thermally comfortable glass. These glazings are preferably used in the side, rear, and particularly preferably in the roof area of motor vehicles, in particular passenger cars, trucks, busses, or even rail vehicles. In the case of large glazings in particular, the elimination of a mechanical shading device is enormously advantageous, since this makes it possible to reduce mounting space and weight.

It is therefore particularly advantageous to use self-darkening, thermally comfortable glass as a glass roof in passenger cars or busses without any additional mechanical shading devices.

What is claimed is:

1. A self-darkening laminated vehicle window for a vehicle, the vehicle window comprising:
   an outer glass pane;
   an inner glass pane;
   a function layer made of a low-emission material having an emission factor for infrared radiation of less than 0.5 disposed on an inside surface of the inner glass pane; and
   a suspended particle device film disposed between the inner glass pane and the outer glass pane and in contact with the inner glass pane and the outer glass plane, wherein the vehicle window has a dark transmission of less than or equal to 5% and a bright transmission of more than 20%.

2. The vehicle window as recited in claim 1, wherein at least one of the inner and outer glass panes includes electrochrome glass.

3. The vehicle window as recited in claim 1, wherein at least one of the inner and outer glass panes includes primarily silicate glass.

4. The vehicle window as recited in claim 1, wherein the low-emission material includes electrically conductive SnO compounds.

5. The vehicle window as recited in claim 4, wherein the SnO compound includes at least one of indium oxide and metal fluoride.

6. The vehicle window as recited in claim 1, wherein the function layer includes one of a coating or a film of the low-emission material having a thickness ranging from 50 nm to 500nm.

7. The vehicle window as recited in claim 1, wherein the dark transmission and the bright transmission values of the vehicle window are determined independent of a shading of an additional mechanical shading device.

* * * * *

UNITED STATES PATENT AND TRADEMARK OFFICE
CERTIFICATE OF CORRECTION

PATENT NO. : 6,910,729 B2
DATED : June 28, 2005
INVENTOR(S) : Thomas Kraenzler, Andreas Leupolz and Werner Schreber It is certified that error appears in the above-identified patent and that said Letters Patent is hereby corrected as shown below:

<u>Column 3,</u>
Between lines 16 and 17, please add the following:
-- The glass provided with SPD films is typically designed as laminated safety glass, the SPD film being layered in the middle between two panes of silicate glass. However, it is also possible to provide the film on the inside or outside of single-layer glass, preferably safety glass. In this configuration, another film or coating is suitable for protecting against mechanical damage, for example weathering effects. --.

Signed and Sealed this

Eleventh Day of October, 2005

JON W. DUDAS
*Director of the United States Patent and Trademark Office*